United States Patent [19]
Nolt et al.

[11] 3,712,654
[45] Jan. 23, 1973

[54] KNOTTER MECHANISM HAVING A TWINE GUIDE COOPERATING WITH A BILL HOOK

[76] Inventors: Edwin B. Nolt, New Holland; Richard R. Eby, Ephrata; Harry G. Eberly, New Holland, all of Pa.

[22] Filed: Oct. 13, 1971

[21] Appl. No.: 188,409

[52] U.S. Cl. ................................................. 289/2
[51] Int. Cl. ............................................ A01d 59/04
[58] Field of Search ............................. 289/2, 8, 13

[56] References Cited

UNITED STATES PATENTS

| 3,400,959 | 9/1968 | Grillot | 289/2 |
| 3,416,824 | 12/1968 | Nolt et al. | 289/2 |

*Primary Examiner*—Louis K. Rimrodt
*Attorney*—John C. Thompson et al.

[57] ABSTRACT

A knotter mechanism has a twine guide finger extending towards and overlapping with the bill hook for insuring that the leading strand of twine is positioned on the bill hook when the bale is being initially formed.

17 Claims, 7 Drawing Figures

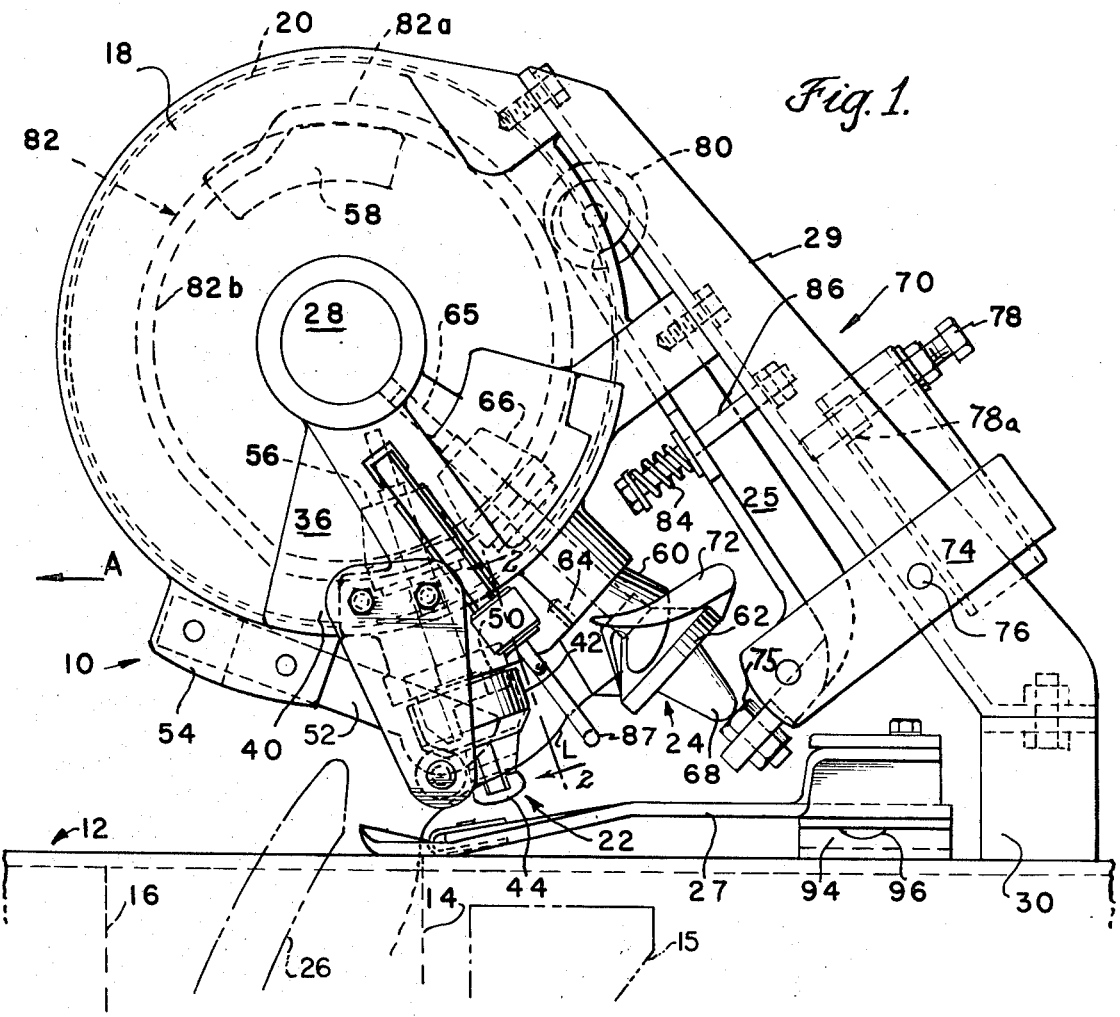
Fig. 1.
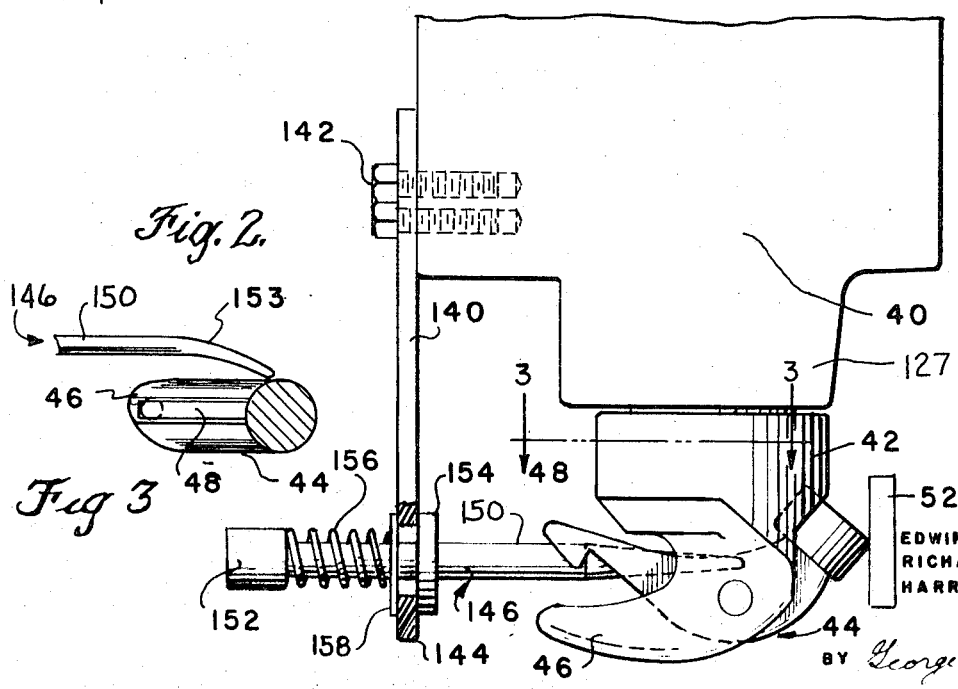
Fig. 2.
Fig. 3
INVENTOR
EDWIN B. NOLT
RICHARD R. EBY
HARRY C. EBERLY
BY George C Bower
ATTORNEY INVENTOR
EDWIN B. NOLT
RICHARD R. EBY
HARRY C. EBERLY
BY George C. Bower ATTORNEY

KNOTTER MECHANISM HAVING A TWINE GUIDE COOPERATING WITH A BILL HOOK

RELATED PATENTS AND PATENT APPLICATION

This specification describes an improvement on the knotter mechanism disclosed in the U.S. Pat. No. 3,410,589 issued on Nov. 12, 1968 to Edwin B. Nolt; U.S. Pat. No. 3,419,301 issued on Dec. 31, 1968 and U.S. Pat. No. 3,443,511 issued on May 3, 1969 to Richard R. Eby; and U.S. Pat. No. 3,418,014 issued on Dec. 24, 1968, U.S. Pat. No. 3,472,544 issued Oct. 14, 1969, U.S. Pat. No. 3,448,681 issued on June 10, 1969 and U.S. Pat. No. 3,482,866 issued on Dec. 9, 1969 to Edwin B. Nolt and Richard R. Eby and the copending patent application Ser. No. 158,746 filed on July 1, 1971 by Edwin B. Nolt.

FIELD OF THE INVENTION

This invention relates to knotter mechanisms of crop balers and is directed particularly to the relationship of the leading strand of the twine and the bill hook of the knotter unit.

BACKGROUND OF THE INVENTION

Reliability in the tying of bales is very important in the operation of a mobile baler. It is in the formation of the knot that difficulties will be encountered once the baler is set for making square shaped bales out of a particular crop. Misties occur for various reasons and result in a loose bale of hay. These have to be rebaled and, often, if one bale is improperly tied it is quite likely a series of loose bales will occur.

This uncertainty in the baling operation causes a lack of confidence on the part of the operator in the baling process. As a result, he divides his attention between forward driving of the tractor and rearward checking of the dropped bales for detecting any that are broken. Even in a self-propelled baler this diversion from the driving of the baler is necessary since the knotter mechanism is to the side and the bales are discharged out of the back of the machine.

If the operator has confidence in the knotter mechanism he can give his attention to driving the tractor and picking up the hay. With his full attention in the forward direction he can drive the tractor across the field at a greater speed and not be hampered by even an occasionally rebaling.

This greater baling speed and lack of misties are extremely advantageous. Baling periods are limited by the moisture content of the crop material and it is therefore desirable to bale as much crop as it is possible during these periods. The time of baling of a crop is often critical and a delay of a day may result in a substantial loss in nutrient value of the crop. Thus, the greater speed may complete the baling of a field that otherwise would have to be delayed until the next baling period. Also there are economic advantages for the custom operator in that he can produce more bales per hour for the capital investment in the baler and tractor, time is not lost in rebaling and the rather expensive twine is not wasted. Also, he can complete one baling assignment during the baling period and move to the next assignment during non-baling periods without the loss of baling time. Thus, the need of the baling operator to have complete confidence in the knotter mechanism is important.

The improvements in the knotter mechanism set forth in the foregoing patents and patent application provide a knotter mechanism that has a high degree of operational dependability and durability. This invention cooperates with these previous improvements to the knotter mechanism to further perfect the knotter for complete reliance on its knotting ability. The improvement is specific to the relationship of the leading strand of twine and the bill hook during the period between the completion of tying cycle and the continuous holding of the leading strand in tension by the first several wads of hay of the next bale.

In the forming of bales, the leading and trailing strands are normally held in tension. The leading strand has the terminal end securely held by the clamping unit of the knotter mechanism and extends in tension across the twine guide member, bill hook, twine finger and around the rear of the bale being formed. The trailing strand is held in tension by the rising twine needle against the secondary pressure of the twine clamp on the twine storage box. The rotating twine hook on the clamping unit, the twine guide member between the clamping unit and bill hook, the twine guide finger at the bill hook and twine finger on the bale case position the tensioned strands in relation to the bill hook and clamping unit These elements effectively cooperate during the brief tying cycle to hold the strands tight and in the proper places. Also during that portion of the continuous baling operation when the twine is taut these elements are effective in controlling the position of the twine. However, under slack conditions the control is not as effective.

These slack conditions of the twine occur from the time the twine needle retracts through the bale case until the leading strand is held permanently in tension by the bale being formed. On the return of the needle, the twine is still being held under the secondary pressure of the twine clamp usually on the twine box. Thus, the leading strand is still under some tension. On the needle returning to the home position, the primary pressure is then applied to the twine. This primary baling pressure is less than the secondary tying pressure and the tension on the twine is not as great. This lesser pressure may let the twine twist off the bill hook or be dislodged. However, a more serious condition occurs when the initial wads of the bale are deposited by the plunger. The folded charge of crop material carried into the bale chamber by the feed mechanism is compressed into a wad by the plunger. On the release of the plunger to return for the next charge, the wad expands and releases the tensioned leading strand. The extended leading strand now moves forwardly forming a slack loop over the bill hook. This may be repeated several times until three of four wads are deposited and is especially pronounced with springy type grasses. The pulsating loop condition may result in the twine moving out of line with the bill hook and missing the bill hook when the strand is again tensioned. This results in a mistie.

OBJECTS AND SUMMARY OF THE INVENTION

It is, therefore, an object of this invention to eliminate the foregoing causes of a mistie and to improve the reliability of the knotter mechanisms.

Another object of this invention is to maintain the strand of twine in relation with the bill hook so that on tensioning of the strand it will be positioned across the top of the bill hook.

Another object of this invention is to maintain the twine on the forward side of the bill hook.

In summary, the knotter mechanism has a twine guide means overlapping with the bill hook to maintain the leading strand of twine positionable on the bill hook on the formation of the bale irrespective of slack conditions of the twine.

These and other objects and advantages of this invention will be apparent from the following description and claims taken in connection with the accompanying drawings which illustrate the features of the invention.

BRIEF DESCRIPTION OF THE DRAWINGS

FIG. 1 is a left side view of the knotter unit.

FIG. 2 is an enlarged and forward view of the twine guide finger and bill hook take along line 2—2 of FIG. 1.

FIG. 3 is an enlarged partial plan view of the twine guide finger and bill hook taken along line 3—3 of FIG. 2.

DETAILED DESCRIPTION OF THE EMBODIMENTS OF THE INVENTION

Figure 4:
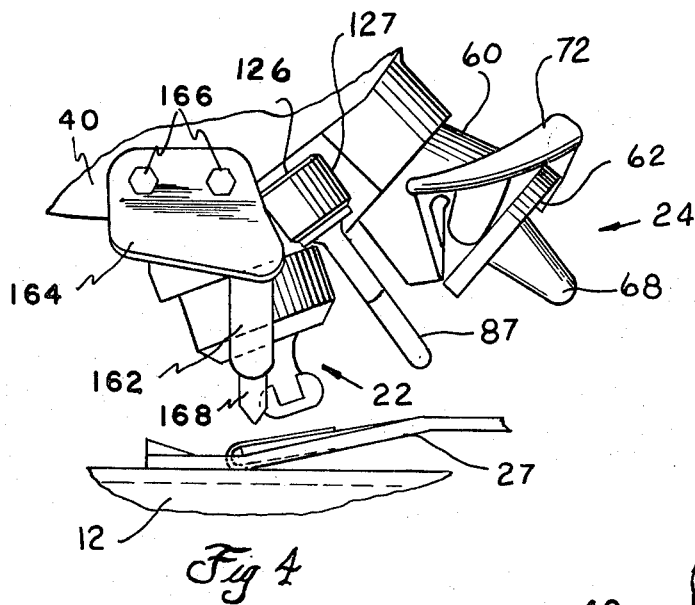
FIG. 4 is a left side view of another embodiment of the twine guide finger on a fragmentarily shown knotter mechanism.

In the aforementioned patents and patent application various improvements on the knotter mechanism are set forth. This description is of another improvement for advancing the high degree of dependability of the knotter mechanism and is made in reference to those prior patents and patent application. Although in this description only a single knotter mechanism is disclosed, a plurality of knotter mechanisms may be provided to tie a plurality of loops. Usually two knotter mechanisms are provided in side by side relation to operate simultaneously to tie a bale. In describing the knotter mechanism, reference to the right and left is in relation to the forward direction of the baler indicated by the arrow A in FIG. 1. In describing the loop of twine around the bale, the leading strand L is the strand of twine extending over the top of the bale, down the rear of the bale and forward along the bottom. The trailing strand T is the strand of twine drawn up by the twine needle along the front of the bale and over the forward portion of the top.

Now, referring to FIGS. 1–3 of the drawings, an embodiment of the invention is shown in connection with a knotter mechanism 10 mounted on top of the bale case 12 of the baler. The bale case is fragmentarily shown, as well as, a bale 14. The bale is in place below the knotter unit and is awaiting movement to the rear by the succeeding compression strokes of the plunger for compressing the charges of crops delivered to the bale case through the feed opening 16 by a feed mechanism (not shown).

The knotter mechanism essentially comprises a knotter frame casting 18, a gear and cam member 20, knotter unit 22, clamping unit 24, pressure lever 25, twine needle 26 and twine finger 27. The improvement to this knotter mechanism, and described later herein, is best shown in the embodiments of the twine guide means illustrated in FIGS. 2 and 5. As to the knotter mechanism, the knotter frame casting 18 and member 20 are mounted on the shaft 28 with the casting in rotatable relation therewith. The member 20 is keyed thereto for rotation on initiation of the tying cycle. The drive mechanism of the knotter is explained in detail, in the U.S. Pat. No. 3,443,511. The casting 18 is held in position by the arm 29 bolted to the bracket 30 mounted on the bale case.

The knotter frame casting 18 rotatably supports the generally radially extending knotter unit 22 and clamping unit 24. The knotter unit and clamping unit are described, in detail, in the aforementioned U.S. Pat. Nos. 3,410,589, 3,418,014 and 3,448,681. The knotter unit has a shaft 36 rotatably mounted in the extension 40 on the lower left side at the periphery of the casting. The exterior end of the shaft has an annular cup-shaped member 42 and a bill hook 44. The bill hook 44 has a shank end at the shaft 36 and a tip at the opposite end. As usual the bill hook comprises a bill hook jaw 46 and a bill hook tongue 48 (FIGS. 2 and 3) pivotally mounted on the jaw at the shank end and actuated to the open position by a fixed cam 50 (FIG. 1) depending from the extension and enclosed within the annular member 42. The tongue 48 is held closed by the resilient lever 52 attached at 54 to the knotter frame casting 18. At the interior end of the shaft 36 is a conical shaped gear 56 keyed to the shaft and actuated by the gear segment 58 on the inside of the member 20. The gear segment rotates the bill hook through a complete circular arc for twisting the trailing and leading strands in the formation of the knot.

The clamping units 24 has two clamping members 60, 62 with interfitting conical surfaces for holding the terminal ends of the strands of twine. The member 60 is fixed in position by the pin 64 which fits in a bore in the extension 40. The member 62 has a shaft 65 extending through the member 60, and extension 40 into the enclosed chamber formed by the casting 18 and the gear and cam member 20. A gear 66 is slideably keyed on the splined portion of the shaft 65 so the clamping member 60 can be moved axially relative to the fixed member 60. The clamping member 62 is rotated by the gear segment 58 meshing with the gear 66 on rotation of the gear and cam member 20 by the shaft 28. The slideable and rotatable clamping member 60 has a knob 68 extending axially from the bottom of the member 60. The clamping member 62 and its operation are more fully explained in the aforementioned U.S. Pat. No. 3,419,301. The clamping pressure means 70 engages the end of the knob and applies either a primary pressure or a secondary pressure to press the two members together. The greater primary pressure is applied during the baling operation and a portion of the tying cycle. The lesser secondary pressure is applied to a portion of the tying cycle to permit the terminal end of the leading strand to slide from between the clamping members and permit the positioning of the strand of twine carried up by the twine needle between the clamping members.

The rotatable clamping member 62 has a curved twine hook 72 extending from the lower periphery thereof. The curved twine hook on rotation of the member 62 guides the trailing strand T carried up by the twine needle into the base of the twine hook and between the clamping member 60 and 62 on the application of the secondary clamping pressure.

The cam and gear member 20 rotates in a clockwise direction as viewed in FIG. 1. The gear segment 58 engages the knotter unit 22 and clamping unit 24 to rotate the bill hook in a clockwise direction as viewed in FIG. 2. The clamping unit 24 correspondingly rotates at about 160° to 170° out of phase with the rotation of the knotter unit. The bill hook twists the leading and trailing strands L and T around the base of the bill hook in the last quadrant before the bill hook reaches the initial position, as shown in FIG. 1, the tongue 48 is opened to grasp the two strands of twine extending between the clamping unit and the bill hook, as described more fully in the U.S. Pat. No. 3,410,589. The formation of the knot is completed by the pulling of the twisted portion over the end of the bill hook by the return of the twine finger to the home position. The clamping member 62 has a knife at the base of the twine hook to sever the newly clamped strand from the knot. This operation is explained in U.S. Pat. No. 3,419,301.

The clamping pressure means 70 comprises, in general, bell crank lever 25 pivotally mounted on an L-shaped bracket 74, as shown in FIG. 1. This clamping pressure means is set forth in U.S. Pat. No. 3,472,544. For the purposes of this description the structure and operation are briefly explained. The primary and secondary pressures on the clamping unit 24 are applied through the bell crank lever 25 pivotally mounted adjacent the outer end of the clamping unit in the L-shaped bracket 74. The L-shaped bracket is pivotally mounted at 76 and has an adjusting bolt 78 for setting the pressures applied to the clamping unit 24. The adjusting bolt 78 is threaded in the boss 78a on the bracket 74 and sets the pressure applied by surface 75 on the lever 21 to the rotating clamping member 62. The bell crank lever 25 has a cam roller 80 rotatably mounted at the upper end for engaging the cam 82 on the cam and gear member 20. The primary pressures are applied to the cam clamping unit 24 when the roller 80 engages the portion 82a of the cam 82 and applies the secondary and lesser pressure when the roller 80 is at the relief cam portion 82b. The secondary pressure is provided by the spring 84 when the roller 80 is at this portion 82b of the cam 82. The spring 84 is held against the longer arm of the bell crank 25 by the bolt and nut arrangement 86 anchored on the arm 29. The gear and clamp member 20 is keyed to the timing shaft 28 and the cam 82 rotates with the gear segment 58 so that the rotation of the knotting unit and the clamping unit is timed with the application of the primary and secondary pressures. As seen from FIG. 1, even in the tying cycle, the primary pressure is applied to the clamping units slightly less than the first half of the rotation of the bill hook.

Figure 6:
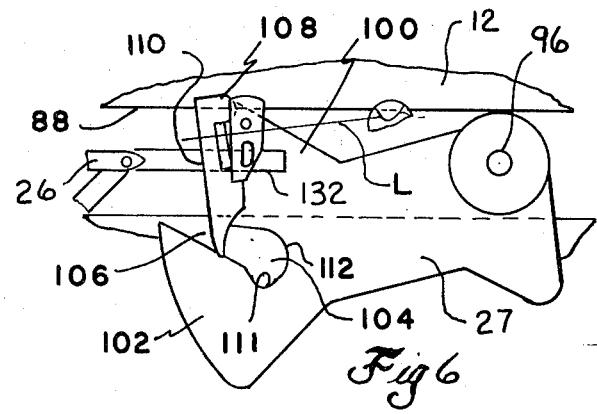
FIG. 6 is a top view of the twine finger in the bale forming or home position.
Figure 7:
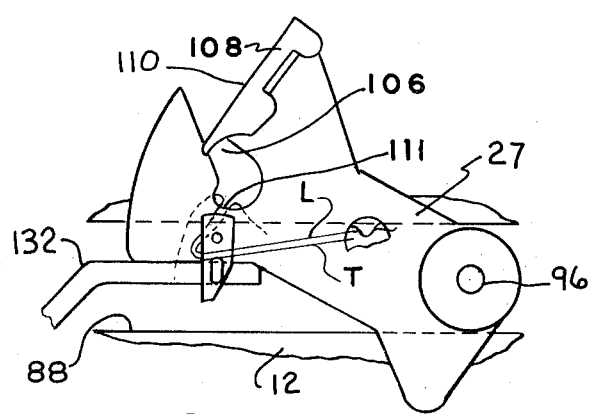
FIG. 7 is a top view of the twine finger in the twisting or actuated position.

Assisting in the formation of the knot are the twine finger 27 and the twine guide member 87. The twine finger 27 is generally positioned over the longitudinal slot 88 in the bale case through which the twine needle 26 moves to carry the twine to the knotter mechanism. The bracket 94 extends transversely to the bale case and spans the longitudinal opening to pivotally support the twine finger 27 at the pivot 96. The twine finger extends forwardly from this pivotal mounting, underneath the knotting unit 22 and forwardly thereof to resist the tension forces of the leading strand. The twine finger shown in this embodiment is more fully described in the aforementioned copending application Ser. No. 151,746. The twine finger, shown best in FIGS. 6 and 7, has a lateral extension 100 and a hook portion 102 with an opening 104 and an entrance 106 thereto between the lateral extension and the hook portion. A latch 108 extends across the front of the lateral extension and is pivotally attached thereto to permit the trailing and leading strands of twine to enter into the opening 104. The leading and trailing strands engage the forward surface 110 of the latch and slide down this surface into the opening 104. The twine finger is suitably connected by linkages and cams to the timing shaft 28 to operate the twine finger in coordination with the knotting unit 22 and clamping unit 24. The twine finger is in the position shown in FIG. 6 during the baling operation and the commencement and end of the knotting cycle. It is pivoted to the right to the twisting position (FIG. 7) to move the strands of twine into the opening 104. The edge 111 pulls the strands against the base of the bill hook, as shown in FIG. 7, to insure that the strands are properly positioned on the rotation of the bill hook. On the completion of the rotation of the bill hook, the twine finger returns to its initial position (FIG. 6). The edge 112 spaced to the left from the bill hook acts as an anvil around which the strands of twine are pulled by the discharging bale. This insures removal of the knot from the end of the hook. In the initial baling position, the leading twine L engages the forward edge of the latch so that the twine finger carries the pulsating tension forces created by the compression of the wads of crop material into a bale.

The twine finger performs four important functions during the baling and tying operations. During the baling operation, it carries the twine pressures rather than the bill hook. In the tying operation, it holds the strands snuggly against the base of the bill hook for properly positioning the strands for the twisting step of the strands. At the end of the tying operation, it pulls the twisted strands down the bill hook to form the knot and, lastly, it functions as an anvil for finally pulling the knot from the grip of the tongue and jaw of the bill hook.

Figure 5:
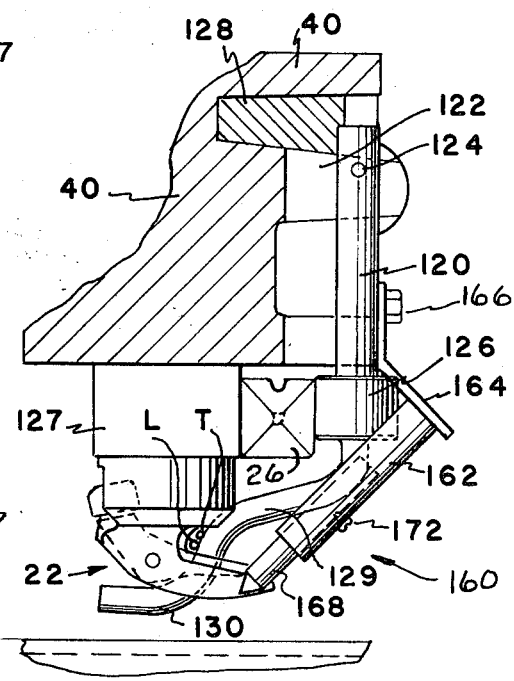
FIG. 5 is a rearward view of the twine guide finger, bill hook and twine guide member.

The twine guide member 87 (shown in FIGS. 1, 4 and 5) is in a generally axially extending plane at an angle to the horizontal and about midway between the knotting unit 22 and clamping unit 24. This member and its function are briefly described herein. A more detailed description is set forth in the aforementioned U.S. Pat. No. 3,482,866. The twine guide member is pivotally mounted in the left side of the knotter frame casting 18 by a straight vertical shaft 120 positioned in a groove 122 in the extension 40 and pivotally connected at its upper end by pin 124. At the lower end of the shaft is a roller 126 at the level of the boss 127 to be engaged by the twine needle 26 as it moves in its upward stroke past the clamping unit 24. At the upper end above the pin 124, a resilient block 128 is recessed in the casting and opposes the pivoting motion imparted by the twine needle. This block, in cooperation with the needle, locates the twine guide member in its operative position during the tying cycle. The twine guide member 87 has a straight portion 129 extending at a slight angle downwardly from the horizontal. This straight portion is connected to the lower end of the shaft and extends to the right to overlap with the bill hook. The generally L-shaped end member 130 is positioned downwardly from the straight portion 129 and between the bill hook and clamping unit. The twine needle carries the trailing strand T over the twine finger and bill hook and the intermediate portion of the twine guide member as shown in FIG. 5. The trailing strand as it is drawn up through the slot 88 is forced to the right and in line with the bill hook by the guide bracket 132 (FIGS. 6 and 7) in the slot. The guide bracket is in the slot with forward angled portion extending from the left side of the slot and a straight portion extending rearwardly therefrom. The straight portion has its rearward end underneath the twine finger so that the strands are held to the right over the bill hook. The twine guide member also supports the leading strand L so that the two terminal ends of the loop are held by the L-shaped end member 130 of the twine guide member so that on rotation of the bill hook the two strands will be positioned between the open tongue and fixed jaw as the bill hook completes its rotation. The tongue 48 closes on the strands of twine to hold the twine as the twisted portion of the strands is pulled along the bill hook by the twine finger and forms a loop portion of the knot. Another function of the L-shaped end member 130 is to help keep the trailing strand in position so that it rides under the clamping member 60.

The particular improvement of this knotter mechanism is the twine guide means positioned to extend passed the tip end of the bill hook to hold the twine in position for engaging the bill hook in the initial or home position. In the particular embodiments shown and described, the twine guide finger extends in an opposite direction to the projection of the bill hook and overlaps with the forward side of the bill hook. The twine guide member insures that the slack leading twine strand will always be in a position to be properly drawn across the bill hook when the leading strand is tensioned on the formation of the new bale. The twine in its slack condition is particularly subject to dislodgement from the bill hook. This may be caused by the vibrations of the baler, crop material or debris accumulated around the the knotter mechanism or, more particularly, due to the opposite twist of the twine. Even the regular twist of the twine may cause it to loop and kink. But when the twine is twisted in the opposite direction the loops or kinks may throw the twine over the end of the bill hook. When the twine is beyond or underneath the bill hook it will tension under the bill hook so that it cannot make the knot with the trailing strand when it is carried up by the needle. Therefore a mistie occurs.

Two embodiments of the improvement are shown and described. One embodiment is shown in FIGS. 2 and 3 of the drawings and another embodiment is shown in FIGS. 4 and 5. Referring first to the embodiment shown in FIGS. 2 and 3, a bracket 140 is mounted on the frame casting extension 40 by two bolts 142. The bracket extends downwardly parallel to the knotter unit to the level of the bill hook. The bracket is positioned slightly offset and forward in relation to the knotter unit. At the lower end is an opening 144 through which the twine guide finger 146 extends. The twine guide finger comprises an elongated cylindrical portion 150 with a head 152 on the opposite side of the bracket 140 from the bill hook. Adjacent to the bill hook, the twine guide finger has a tapered portion 153 bent towards the bill hook to position the tip of the twine guide finger adjacent to and, preferably, in contact with the bill hook in the vicinity of the base (FIG. 3). The twine guide finger has an annular portion 154 fixedly attached thereto on the same side of the bracket 140 as the bill hook. On the other side of the bracket is a helical spring 156 between the head 152 and a washer 158 spanning the opening 144. The opening 144 is substantially larger than the twine guide finger and the washer and annular portion are substantially larger than the opening. This, in combination with the head and spring provides for substantial resilient angulation of the finger relative to the bracket and bill hook. Thus, the twine guide finger is resiliently mounted on the bracket 140 so that it may turn and yield as the bill hook is rotated. The bill hook engages the tapered end and pushes the twine guide finger clear of the bill hook so that the bill hook carries the strands in the twisting operation.

The extension 40, the annular cup shaped member 42, the bill hook and the twine guide finger and the bracket 140 form a closed opening for receiving and retaining the twine. The twine guide finger extends along the forward side of the bill hook. Slack twine looping or kinking may bear against the twine guide finger 146 or bracket 140 and will be held forwardly above the bill hook. On tensioning of the twine, it will move towards the bill hook and be positioned in proper relation thereto. The trailing strand is carried up by the needle through this closed opening so that both the leading and strands are within the opening.

In FIG. 4 and 5, another form of the invention is shown in the preferred embodiment of the twine guide finger 160. In this embodiment, a cylindrical rigid member 162 is securely fastened by welding or the like to a bracket 164 which is attached to the extension 40 by the bolts 166. The bracket 164 is bent away from the knotter unit, as shown in FIG. 5. The cylindrical member is mounted perpendicular thereto and extends downwardly at an angle to the horizontal with the lower end spaced from the bill hook. A straight, resilient plastic piece 168 has a cylindrical portion fitting in the bore of tubular mounting 162 and extends downward to overlap with the bill hook. A set screw 172 holds the piece in place. The conical tip at the opposite end of the piece from the tubular member overlaps with the tip end of the bill hook and engages the forward side thereof. By this engagement or positioning the guide finger 160, the bill hook 44, annular member cup 42 and the bracket 164 form an enclosed space for restricting the movement of the strands of twine carried therein by the twine needle.

The slack twine is retained within this enclosed space and on tensioning of the twine it is positioned back on the bill hook by the twine guide finger. Irrespective of any dislodgement or looping of the strand, the strand will always be repositioned back on the bill hook to insure proper placement of the strands for twisting by the bill hook. In the twisting step, the bill hook bends the overlapping resilient piece out of the way.

The resilient piece 168 is, preferably, a polyurethane cord of about 80 ducrometer. It has a diameter of five sixteenths of an inch and extends about seven-eighths of an inch from the rigid metal mounting member 168. The conical tip is approximately 30° and has a length of about five sixteenths of an inch. The flexibility of the resilient member is such as to bend with little pressure on engagement by the rotating bill hook. The conical tip overlapping with the bill hook minimizes the bending and permits the bill hook to easily slide past the resilient piece. The pointed end of the conical tip is deflected about one quarter of an inch by the bill hook. On the other hand, the member has sufficient stiffness to resist forces applied to the forward side by tensioning strands. The resilient piece is held at both ends to these rearwardly directed forces. One end is held in the mounting member 162 and the tip presses against the bill hook. Thus, the supporting of both ends of the piece and the stiffness of the resilient member keeps it in position and maintains the tensioning strand on the forward side and guides it down on to the bill hook.

While the invention has been described, it will be understood that it is capable of further modifications and this application is intended to cover any variations, uses, or adaptations followed in general, the principles of the invention and including such departures from the present disclosure as come within known or customary practice in the art to which the invention pertains, and as may be applied to the essential features hereandbefore set forth and as fall within the scope of the invention or the limits of the appended claims.

Having thus described my invention, what we claim is:

1. In a knotter mechanism for
a baler having a bale case with a feed opening in the side of the bale case for passing charges of crop material to said bale case, a plunger in said bale case for compressing the charges of hay into wads for forming bales;
said knotter mechanism mounted on the bale case and including a clamping unit for holding the terminal end of the strand of twine extending around a bale as it is being formed and including a bill hook for tying the leading strand of twine with the trailing strand of twine, said bill hook having a shank end and an opposite tip end;
a twine needle pivotally mounted on said bale case to pass through said bale case carrying the trailing strand of twine around the end of the compressed crop material and across the bill hook and clamping unit and returning through the bale case with the next stand held at the end thereof in the clamping unit and extending forwardly over the bill hook; and
resilient means at said bill hook spaced from said shank end to prevent movement of twine positioned from above said bill hook around the tip end when said bill hook is in the home position and permits said bill hook to rotate.

2. In a knotter mechanism as set forth in claim 1 wherein said resilient means extends generally transversely to said bill hook.

3. In a knotter mechanism as set forth in claim 1 wherein said resilient means extends in a direction opposite to the direction of said bill hook from said shank end and in overlapping relation with the forward side of said bill hook.

4. In a knotter mechanism as set forth in claim 3 wherein said resilient means extends downwardly at an angle to said bill hook and overlaps with said tip end on the forward side.

5. In a knotter mechanism as set forth in claim 3 wherein said resilient means extends at the same level as said bill hook.

6. In a knotter mechanism as set forth in claim 1 wherein said resilient means is flexed by said bill hook clear of the path of said bill hook on rotation in the tying cycle.

7. In a knotter mechanism as set forth in claim 1 wherein said resilient means is on the forward side of said bill hook and in pressure engagement therewith.

8. In a knotter mechanism for
a baler having a bale case with a feed opening in the side of the bale case for passing charges of crop material to said bale case, a plunger in said bale case for compressing the charges of hay into wads for forming bales;
said knotter mechanism mounted on the bale case and including a clamping unit for holding the terminal end of the strand of twine extending around a bale as it is being formed and including a bill hook for tying the leading strand of twine with the trailing strand of twine, said bill hook having a shank end and an opposite tip end;
a twine needle pivotally mounted on said bale case to pass through said bale case carrying the trailing strand of twine around the end of the compressed crop material and across the bill hook and clamping unit and returning through the bale case with the next strand held at the end thereof in the clamping unit and extending forwardly over the bill hook; and
a resilient twine guide means having a projection extending in a direction opposite to the extension of said bill hook from the shank end and extending in overlapping relation with the forward side of the bill hook to maintain the leading strand of twine on the forward side of said bill hook.

9. In a knotter mechanism as set forth in claim 8 wherein said twine guide projection extends downwardly at an angle from above said bill hook to engage said bill hook.

10. In a knotter mechanism as set forth in claim 8 wherein said twine guide projection comprises a sleeve extending downwardly to said bill hook and at an angle thereto and a resilient plastic piece mounted therein and extending downwardly from said sleeve to overlap with said bill hook on the forward side thereof.

11. A knotter mechanism as set forth in claim 10 wherein said bill hook engages said piece to move said piece clear of said bill hook on rotation.

12. In a knotter mechanism as set forth in claim 8 wherein said twine guide projection is a resiliently mounted metal rod extending along the forward side of the bill hook.

13. In a knotter mechanism as set forth in claim 8 wherein bracket means with an opening is provided for supporting said twine guide means, and said projection extends through an opening permitting said projection to resiliently angle in said opening for moving clear of said bill hook on rotation.

14. In a knotter mechanism as set forth in claim 8 wherein bracket means is provided for supporting said twine guide means and said resilient twine guide means has spring means for holding said projection in a given position and permitting said projection to deflect clear of the path of rotation of said bill hook.

15. In a knotter mechanism as set forth in claim 13 wherein said bracket means has an opening and said projection extends therethrough and has a flange between said bill hook and bracket means and said spring means presses said flange against said bracket means to hold said projection in the given position and to permit deflection on engagement by said bill hook.

16. In a knotter mechanism for
a baler having a bale case with a feed opening in the side of the bale case for passing charges of crop material to said bale case, a plunger in said bale case for compressing the charges of hay into wads for forming bales;

said knotter mechanism mounted on the bale case and including a clamping unit for holding the terminal end of the strand of twine extending around a bale as it is being formed and including a bill hook for tying the leading strand of twine with the trailing strand of twine, said bill hook having a shank end and an opposite tip end;

a twine needle pivotally mounted on said bale case to pass through said bale case carrying the trailing strand of twine around the end of the compressed crop material and across the bill hook and clamping unit and returning through the bale case with the next strand held at the end thereof in the clamping unit and extending forwardly over the bill hook; and a twine guide means comprising a cylindrical member with a bore and mounted on said knotter mechanism and a resilient cylindrical piece fitting in said bore and firmly supported by said cylindrical member, said piece extending downwardly in a direction opposite to the extension of said bill hook from said shank end to overlap and deflectingly engage the forward side of the tip end of said bill hook to keep the leading strand of twine on the forward side of said bill hook.

17. In a knotter mechanism for a baler having a bale case with a feed opening in the side of the bale case for passing charges of crop material to said bale case, a plunger in said bale case for compressing the charges of hay into wads for forming bales;

said knotter mechanism mounted on the bale case and including a clamping unit for holding the terminal end of the strand of twine extending around a bale as it is being formed and including a bill hook for tying the leading strand of twine with the trailing strand of twine, said bill hook having a shank end and an opposite tip end;

a twine needle pivotally mounted on said bale case to pass through said bale case carrying the trailing strand of twine around the end of the compressed crop material and across the bill hook and clamping unit and returning through the bale case with the next strand held at the end thereof in the clamping unit and extending forwardly over the bill hook; and a twine guide means comprising a bracket attached to said knotter mechanism and having an opening therethrough, a projection extending through said opening towards said bill hook and overlapping the tip end of said bill hook on the forward side, a flange on said projection between said bill hook and said bracket and larger than said opening, spring means on the opposite side of said bracket from said bill hook engaging said projection to press said flange against said bracket for positioning the projection in the overlapping relation and permitting the projection to deflect clear of said bill hook when engaged by said rotating bill hook.

* * * * *